Patented Aug. 18, 1942

2,293,685

UNITED STATES PATENT OFFICE 2,293,685

PHENOLIC RESIN COMPOSITION

Viola B. Makeever, Winthrop, Mass., assignor to Makalot Corporation, Boston, Mass., a corporation of Arizona No Drawing. Application March 16, 1940, Serial No. 324,325

15 Claims. (Cl. 260—28)

This invention relates to a composition of matter and the method of making it. More particularly, the invention relates to a plastic including a phenol-aldehyde resin and a special modifying agent.

The art of making phenolic resins by the condensation of a phenol and an aldehyde is widely known and is practiced on an extensive scale. Also, a very large number of softeners, plasticizers, or modifiers have been proposed for inclusion in phenolic resins, in the effort to impart properties that are important for certain purposes. In spite of the comprehensive studies that have been made, there is still difficulty with the phenolic resins in the production of certain molded products or coats of finishing material. The difficulty arises from waviness, resin flow lines, dogskin, or orange peel, as undesired irregularities of surface of the phenolic resin products are known commercially.

It is an object of this invention to provide a plastic that may be molded or applied as a finishing material with the elimination of these irregularities of surface. Another object is to provide a method of making the improved plastic. These and such other objects as will appear from the detailed description that follows are secured by means of the composition and method to be described.

I have found that hardwood pitch is unique in the properties imparted by its use in phenolic resins.

The invention comprises the inclusion of such pitch in phenol-aldehyde resins. The invention comprises also the method of making the pitch-containing plastic.

The method of making the improved plastic includes subjecting a special mixture to conditions to cause condensation to resinous material, the mixture including hardwood pitch, a phenol, and an aldehyde.

If the objects of the invention are to be secured to the fullest extent possible, it is essential to choose carefully the kind of pitch which is used as the modifier. The pitch should be hardwood pitch from which tarry materials that are volatilizable under usual commercial conditions of distillation have been removed. Such a pitch is the non-volatile residue from the fraction of tarry material used in the Suida process for the extraction of acetic acid from pyroligneous acid. In this process the pyroligneous acid is extracted with the highest boiling fraction of wood tar obtained in the destructive distillation of wood. After the extraction is complete, the tar is heated, to volatilize the extracted acetic acid and other low boiling materials present. Finally, the tar itself is distilled, to give a tar distillate and leave a residue which is known as pitch and which serves as the modifier of the present invention. This pitch is black in color and insoluble in water. It is substantially a solid at ordinary temperatures but becomes plastic on warming. A typical specimen melts at 200° F.

In the use of this pitch various proportions may be included in the phenolic resin, the exact proportion being determined by the particular set of properties desired in the finished plastic material. There is used a relatively large proportion of the pitch to make a softer plastic and a smaller proportion of the pitch when it is desired to obtain the desirable results from its use without making the plastic particularly soft. Ordinarily, there is used about 25 to 60 parts of the pitch for 100 parts of the finished plastic material. For hard plastics, however, the proportion may be as little as 10 parts of the pitch, whereas for very soft plastics the pitch may be increased to as much as 90 parts for 100 parts of the plastic. Proportions here and elsewhere herein are given as parts by weight.

The proportion of the selected phenol and aldehyde to each other is that which is usual in the manufacture of phenol-aldehyde condensation products.

In addition to the principal ingredients that have been discussed, there is incorporated in the mixture before condensation a catalyst or agent adapted to accelerate condensation of the phenol with the aldehyde. Thus, there may be used a minor proportion of a strong mineral acid, such as sulfuric or hydrochloric acid, or oxalic acid. Other acid catalysts that may be used are zinc chloride and calcium chloride. Or, there may be used as the catalyst a minor proportion of a strong alkali, as, for example, the hydroxide of sodium, potassium, calcium, or barium. The catalyst used may be present in proportions and may be neutralized in conventional manner.

Also, there may be used fillers of usual type, as, for example, wood flour, finely divided diatomaceous earth, short asbestos fibres, or the like.

Typical examples of the practice of the invention are the following.

*Example 1*

There is formed a mixture of 100 parts of phenol, 50 parts of hardwood pitch, and 0.3 part of concentrated sulfuric acid. The mixture is heated in vacuo, say, at a pressure corresponding to twenty-four to twenty-eight inches (of mercury) below normal. The heating is continued until volatile material is largely volatilized. Thus, the heating may be effected at a temperature of approximately 300° F. and the volatilized material collected as a distillate which is discarded. The remaining unvolatilized material is then cooled, as, for example, to a temperature below 150° F., so as to avoid excessive volatilization of formaldehyde which is then introduced.

The formaldehyde is introduced to advantage in the form of an approximately saturated aqueous solution containing about 40 parts by weight of formaldehyde to 60 parts of water. Eighty parts of this solution are used. It is added along with about 0.1 part of additional concentrated sulfuric acid as catalyst of condensation.

The resulting mixture is refluxed for an hour or so at the boiling temperature, which will be approximately 212° F. During this refluxing there is formed a resinous condensation product and an aqueous layer. The aqueous layer is then separated, as by decantation or distillation.

The remaining condensation product is then subjected, in vacuo, to an elevated temperature well above 212° F., as for instance 250° F. to 550° F., for 4 to 6 hours, until a resinous condensation product of the desired melting point is produced. When this condition is obtained, then the condensation product is quickly cooled, as by being flowed into shallow pans.

The resulting resinous material is processed from this stage, in accordance with usual procedures. Thus, finely divided fillers such as wood flour, asbestos, or diatomaceous earth, lubricants, dyes, and hardening agents may be incorporated. The incorporation may be made by the usual method, as by pebble mill grinding and by hot-roll compounding.

There is obtained in this manner a thermoplastic-setting composition which, when hot molded later, is superior in regularity of surface of product produced to phenol-formaldehyde material made comparably except for the omission of the hardwood pitch.

*Example 2*

The procedure of Example 1 is followed, except that the sulfuric acid used as catalyst is substituted by a minor proportion of a strong alkali, as, for example, sodium or potassium hydroxide in amount equal to approximately 0.2 to 0.8 part for 100 parts of phenol. After condensation has progressed to give a product of desired melting point, then there is introduced an amount of an acidic material equivalent to the alkali used. Thus, there may be introduced stearic acid, oxalic, or acetic acid, to neutralize the alkali. Or, neutralization of the catalyst may be omitted.

Ammonium hydroxide may be used as catalyst in place of the sodium or potassium hydroxide. When ammonium hydroxide is used, the proportion of alkali is increased, as, for instance, to a proportion within the range of 4 to 10 parts for 100 parts of phenol.

*Example 3*

The procedure of Example 1 or 2 is followed, except for the time of addition of the pitch. In this modification the pitch is introduced after the phenol and formaldehyde have undergone initial condensation, say, to the "A" stage resin. After the pitch is introduced, then the condensation is continued to give a product of desired melting point, as described.

Particularly good results have been obtained when the pitch is introduced just before the hot-roll compounding in the sequence of steps described in Example 1, the pitch being incorporated in the proportion of 10 to 70 parts to 100 of total mixture so made.

*Example 4*

In this modification the phenol and formaldehyde are condensed approximately to the stage represented in commercial molding powders. The pitch is then incorporated quickly into the hot mixture and the resulting product cooled promptly, so as to avoid further condensation of the phenol and aldehyde.

*Example 5*

The procedure of any one of the above examples is followed with the inclusion of the additional step of dissolving the condensation product, when it reaches a viscous stage, in a solvent or thinner ordinarily used in making phenol-aldehyde varnishes and finishing compositions. Thus, the condensation product in warm condition may be dispersed in V. M. & P. naphtha, kerosene, xylene, alcohols, and/or ketones. The stage to which the finished material is condensed before such dispersion is controlled in accordance with usual commercial practice, so that the condensation product used as a base for the finishing material will be soluble or dispersible in the selected solvent or thinner. Regardless, however, of the similarity of the temperatures and times of heating to usual manufacturing operations, the varnish or finishing material including hardwood pitch gives a superior film of finishing material. It gives a film that is exceptionally nearly or quite free from resin flow lines, waviness, and other undesired irregularities of surface.

In addition to the advantages described in connection with the several modifications of the invention, the use of hardwood pitch lowers the cost for a given weight of the composition.

In the examples given, the phenol may be substituted by another phenol ordinarily used for condensation with aldehydes. Thus, there may be used an active cresol (meta or para) and/or symmetrical xylenol, either alone or mixed with each other or with phenol.

While formaldehyde is particularly satisfactory in making the phenolic resin including hardwood pitch, the formaldehyde may be substituted in whole or in part, in making resins for certain purposes, by another aldehyde, as, for example, by acetaldehyde, paraldehyde, or propionaldehyde.

The proportion of the aldehyde to the selected phenol may be varied in accordance with usual practice.

The use of the improved condensation product as a varnish or finishing material has been discussed. Without the addition of solvent or thinner, the product after cooling may be ground into a powder that is very suitable for hot molding into selected shapes.

Also, the product may be used as a material for impregnating and compositing fabrics. Thus, a number of plies of canvas, duck, asbestos cloth, or like textile material may be treated with the improved product in flowable condition, strongly compressed to consolidate the several plies, and the whole then shaped, either with or without the application of such high temperatures as to cause further condensation of the plastic material on the textile fabric.

It will be understood, also, that the details given are for the purpose of illustration, not restriction, and that variations within the spirit of the invention are intended to be included in the scope of the appended claims.

What is claimed is:

1. A plastic comprising the product of heating under resinifying conditions an intimate mixture of a phenol selected from the group consisting of phenol, an active cresol, and symmetrical xylenol, formaldehyde, hardwood pitch, and a catalyst of condensation of phenol with formaldehyde.

2. A plastic comprising the product of heating under resinifying conditions at a temperature substantially above 212° F. an intimate mixture of an active cresol, formaldehyde, hardwood pitch, and a catalyst of condensation of an active cresol with formaldehyde.

3. A plastic comprising the product of the heating together so as to cause condensation of a mixture of hardwood pitch, phenol, an aldehyde, and a small proportion of ammonium hydroxide as a catalyst of condensation of the phenol and aldehyde the said heating being effected at a temperature of approximately 250° to 550° F.

4. A plastic comprising the product of the heating so as to cause condensation of a mixture of hardwood pitch, phenol, formaldehyde, and a small proportion of a catalyst of condensation of phenol and formaldehyde, the proportion of the pitch being 10 to 70 parts to 100 parts of the plastic and the said heating being conducted under resinifying conditions at a temperature substantially above 212° F.

5. A plastic comprising the product of the heating so as to cause condensation of hardwood pitch, phenol, formaldehyde, and a small proportion of a catalyst of condensation of the phenol and formaldehyde, the proportions used including approximately 38 parts of phenol, 12 parts of formaldehyde on the anhydrous basis, and 50 parts of the pitch and the said heating being effected under resinifying conditions at a temperature of approximately 250° to 550° F.

6. In making a composition of matter, the method which comprises forming a mixture including a phenol selected from the group consisting of phenol, an active cresol, and symmetrical xylenol, an aldehyde hardwood pitch, and ammonium hydroxide as catalyst and subjecting the mixture to a temperature of approximately 250° to 550° F. to cause condensation in the three-component system.

7. In making a composition of matter, the method which comprises forming a mixture including hardwood pitch, a phenol selected from the group consisting of phenol, an active cresol, and symmetrical xylenol, an aldehyde, and a catalyst of condensation of the phenol and aldehyde, and subjecting the mixture to a temperature of approximately 250° to 550° F. to cause condensation.

8. In making a composition of matter, the method which comprises forming a mixture including hardwood pitch, a phenol selected from the group consisting of phenol, an active cresol, and symmetrical xylenol, an aldehyde, and a minor proportion of a strong mineral acid as a catalyst of condensation, and subjecting the mixture to a temperature of approximately 250° to 550° F. to cause condensation.

9. In making a composition of matter, the method which comprises forming a mixture including hardwood pitch, a phenol selected from the group consisting of phenol, an active cresol, and symmetrical xylenol, an aldehyde, and a minor proportion of a strong alkali as a catalyst of condensation, subjecting the mixture to a temperature of approximately 250° to 550° F. to cause condensation, and then neutralizing the alkali.

10. In making a plastic, the method which comprises forming a mixture including hardwood pitch, phenol, and a minor proportion of sulfuric acid as a catalyst of condensation, heating the mixture in vacuo to a temperature of about 300° F., maintaining that temperature until substantially no more material is volatilized, cooling the remaining unvolatilized product to a temperature below approximately 150° F., then mixing into the cooled material an aqueous solution of formaldehyde, refluxing the resulting mixture, to form a condensation product and an aqueous layer, separating the said layer, heating the condensation product in vacuo at a temperature of approximately 250° to 550° F., to cause further condensation, and then cooling the resulting material.

11. In making a plastic, the method which comprises forming a mixture including hardwood pitch, phenol, and a minor proportion of sulfuric acid, heating the mixture in vacuo at a temperature of about 300° F. until substantially no more material is volatilized, cooling the remaining unvolatilized product, incorporating formaldehyde into the said product, heating the resulting mixture for about an hour at approximately 212° F., so as to form a condensation product and an aqueous layer, heating the condensation product to a temperature substantially above 212° F., to cause further condensation, and then cooling the resulting material.

12. In making a plastic, the method which comprises partially condensing a phenol selected from the group consisting of phenol, an active cresol, and symmetrical xylenol with an aldehyde in contact with ammonium hydroxide as catalyst, then admixing hardwood pitch, and continuing the condensation to a plastic resinous material under resinifying conditions at a temperature of approximately 250° to 550° F.

13. A plastic comprising the product of heating under resinifying conditions an intimate mixture of a phenol selected from the group consisting of phenol, an active cresol, and symmetrical xylenol, an aldehyde, hardwood pitch, and a catalyst of condensation of the phenol and aldehyde.

14. In making a plastic, the method which comprises condensing a phenol selected from the group consisting of phenol, an active cresol, and symmetrical xylenol with an aldehyde in contact with a catalyst of the condensation of phenol with the aldehyde, then admixing hardwood pitch on hot compounding rolls.

15. A thermo-setting composition including an intimate mixture of a hardwood-pitch-phenol-aldehyde condensation product and a finely divided solid filler, the said condensation product being the product described in claim 13.

VIOLA B. MAKEEVER.